US007812900B2

(12) United States Patent (10) Patent No.: US 7,812,900 B2
Hung et al. (45) Date of Patent: Oct. 12, 2010

(54) PROVIDING LIGHT GUIDE ELEMENTS IN A BACKLIGHT MODULE

(75) Inventors: Chen-Pin Hung, Tainan (TW); Chien-Chih Huang, Tainan (TW)

(73) Assignee: Chimei Innolux Corporation (TW)

( * ) Notice: Subject to any disclaimer, the term of this patent is extended or adjusted under 35 U.S.C. 154(b) by 807 days.

(21) Appl. No.: 11/657,924

(22) Filed: Jan. 25, 2007

(65) Prior Publication Data

US 2007/0171330 A1 Jul. 26, 2007

(30) Foreign Application Priority Data

Jan. 26, 2006 (TW) .............................. 95103218 A

(51) Int. Cl.
*G02F 1/1335* (2006.01)
*F21V 7/04* (2006.01)
*G02B 6/10* (2006.01)

(52) U.S. Cl. ........................... 349/65; 349/62; 362/610; 385/146

(58) Field of Classification Search ................... 349/62, 349/65; 362/610; 385/146
See application file for complete search history.

(56) References Cited

U.S. PATENT DOCUMENTS

| 4,974,942 | A | * | 12/1990 | Gross et al. | 349/24 |
| 5,018,007 | A | * | 5/1991 | Lang et al. | 348/795 |
| 6,288,700 | B1 | * | 9/2001 | Mori | 345/102 |
| 2005/0140848 | A1 | | 6/2005 | Yoo et al. | |

FOREIGN PATENT DOCUMENTS

TW 557374 10/2003

* cited by examiner

*Primary Examiner*—Michael H Caley
(74) *Attorney, Agent, or Firm*—Trop Pruner & Hu, P.C.

(57) ABSTRACT

A backlight module comprises a light guide plate and at least two light sources. The light guide plate is divided into at least two regions made up of a substrate and a plurality of elongate light guide elements disposed on a surface of the substrate and located in the regions. The light sources respectively correspond to the regions of the light guide plate to provide the elongate light guide elements in the regions with light.

31 Claims, 7 Drawing Sheets

PROVIDING LIGHT GUIDE ELEMENTS IN A BACKLIGHT MODULE

CROSS-REFERENCE TO RELATED APPLICATION

This claims priority under 35 U.S.C. §119 of Taiwan patent application No. 095103218, filed Jan. 26, 2006, which is hereby incorporated by reference.

TECHNICAL FIELD

The present invention relates to a backlight module having elongate light guide elements.

BACKGROUND

In dynamic backlight modules, direct type light source structures are typically used. In a direct type light source structure, direct type light sources, such as light-emitting diodes (LEDs), are arranged in several regions under (or behind) a display panel. The direct type light source structure will dynamically display with the brightness according to the requirements of the displayed video frame; in other word, the light source structure's brightness is dynamically adjusted in different regions of the light source structure so that contrast ratio (maximum brightness to minimum brightness) can be improved. However, the direct type light source structure needs a relatively large number of light-emitting diodes and a relatively large light-mixing distance, so that the required thickness of the backlight module is increased. There are also light-mixing overlap bands between the regions, so that the contrast between the regions is poor.

FIG. 5 depicts a light-mixing space and light-mixing overlap in a conventional backlight module 500. Various LEDs 504 in a section of the backlight module 500 are arranged on a support structure 502, with the LEDs 504 in the depicted section separated into region I and region II. The LEDs 504 can include LEDs of different colors (such as red, green, and blue). Region I corresponds to a dim region of a displayed video frame (a dim region is a region of relatively low brightness), whereas region II corresponds to a bright region of the displayed video frame.

A color-mixing space 506 is provided between the LEDs 504 and a diffuser plate 508 to allow mixing of the different color light from the LEDs 504. The color-mixing space 506 also allows for brightness mixing. As noted above, a conventional backlight module requires that the light-mixing distance (thickness of the light-mixing space 506) be relatively large, which adds to the overall size of the backlight module 500.

Also, light from LEDs in the bright region (region II) can overlap into the dim region (region I) within the light-mixing space 506. This overlap results in a light-mixing overlap band 510, as depicted in FIG. 5, which can cause the brightness in the dim region (region I) to increase, thereby causing reduced contrast ratio between the bright and dim regions.

Furthermore, because the thickness of the backlight module composed of the direct type light source structure cannot be effectively reduced, some studies have been aimed at side-edge type light-mixing structures. The thickness of the backlight module composed of the conventional side-edge type light-mixing structure can be reduced; however, the light-mixing overlap phenomenon between regions still exists, and the contrast between the regions remains poor. Also, in a conventional side-edge type light mixing structure, a light guide plate with a complicated shape is needed, which increases manufacturing complexity and reduces product yield. Also, the possible range of the sizes of conventional side-edge type light mixing structures is limited, and for small liquid crystal display devices, the thickness of conventional side-edge type light mixing structures may still be too large. Furthermore, in this type of structure, the light sources are disposed on the side edge, so that the assembly and the dissipation of heat of the light sources become more complex, thereby increasing the fabrication difficulty of the module and reducing the product yield.

DETAILED DESCRIPTION

A backlight module in accordance with some embodiments includes elongate light guide elements that are part of a light guide plate, where the elongate light guide elements can be directly formed on a flexible substrate. In this manner, a thickness of the light guide plate can be effectively decreased, and the sizes of the elongate light guide elements, the gaps between the elongate light guide elements and the distances between display regions can be precisely controlled. Also, the number of light sources, such as light-emitting diodes or laser diodes, used in the backlight module can be greatly reduced, and the display quality can be enhanced. In addition, the manufacturing yield of the backlight module can be increased, and a thickness of a liquid crystal display (LCD) device that incorporates the backlight module can be reduced. Furthermore, the elongate light guide elements in different display regions respectively correspond to separate light sources, so that optical distribution in different regions can be independently controlled by activating respective light sources at different times or in different ways. Moreover, the backlight module according to some embodiments is suitable for a scanning LCD device or a dynamic LCD device.

Figure 1:
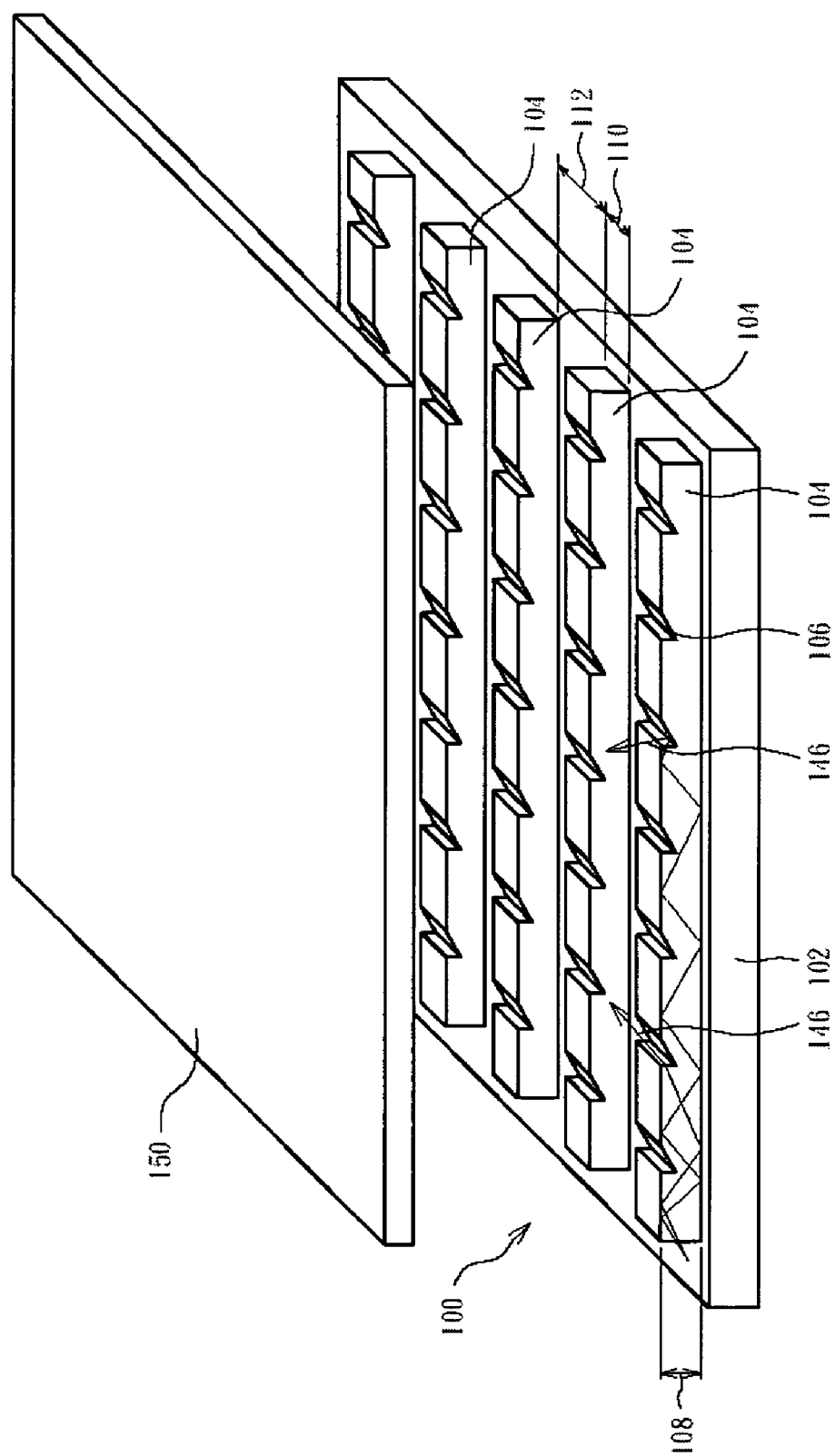
FIG. 1 illustrates a portion of a liquid crystal display device in accordance with an embodiment of the present invention.

FIG. 1 is a three-dimensional view of portions of an LCD device in accordance with an embodiment of the present invention. The LCD device includes a liquid crystal panel 150 and a backlight module (144 in FIG. 2) that includes a light guide plate 100. The light guide plate 100 includes a film substrate 102 and a plurality of elongate light guide elements 104, where the elongate light guide elements 104 may be directly formed on and fixed to a surface of the substrate 102 by, for example, a mold pressing method. The substrate 102 is used to carry the elongate light guide elements 104. The substrate 102 may be formed of a flexible material, such as a plastic material, where the plastic material may be PET (polyethylene terephthalate) or PMMA (polymethyl methacrylate). Alternatively, the substrate 102 may be formed of glass, a diffusive reflection sheet or a silver reflection sheet. The elongate light guide elements 104 can be composed of an optical fiber material, so that the elongate light guide elements 104 are optical fibers. Light in the elongate light guide elements 104 is transmitted by a total reflection method, where light transmitted through the elongate light guide element is reflected by the inner walls of the elongate light guide element as the light traverses along the elongate light guide element. As a result, the elongate light guide elements 104 have high transmission efficiency. An upper surface and/or a lower surface of each elongate light guide element 104 is formed with at least one emission surface structure to allow light to escape from inside the elongate light guide element. In some embodiments, the at least one light emission surface structure formed on each elongate light guide element 104 includes a dot pattern or cut portion(s). Cut portions 106 are shown in FIG. 1, where the cut portions 106 correspond to the required light emission locations of the display device. Effectively, the total reflection transmission of the light is interrupted by the light emission surface structures, so that light 146 can be emitted from the elongate light guide elements 104 through the emission surface structures. The emitted light from the cut portions 106 (or other light emission structures) of the elongate light guide elements 104 are propagated to the liquid crystal panel 150.

In an exemplary embodiment, a gap 112 between each pair of adjacent elongate light guide elements 104 is less than about 100 μm, and can be less than about 50 μm. In an exemplary embodiment, a height 108 of each elongate light guide element 104 is about 250 μm, and a width 110 of each elongate light guide element 104 is also about 250 μm. Each elongate light guide element 104 is effectively a light guide pipe. In one example, each elongate light guide element can be composed of an optical fiber material available in EXX-TMW-COR products provided by Exxelis Co., Ltd.

Figure 5:
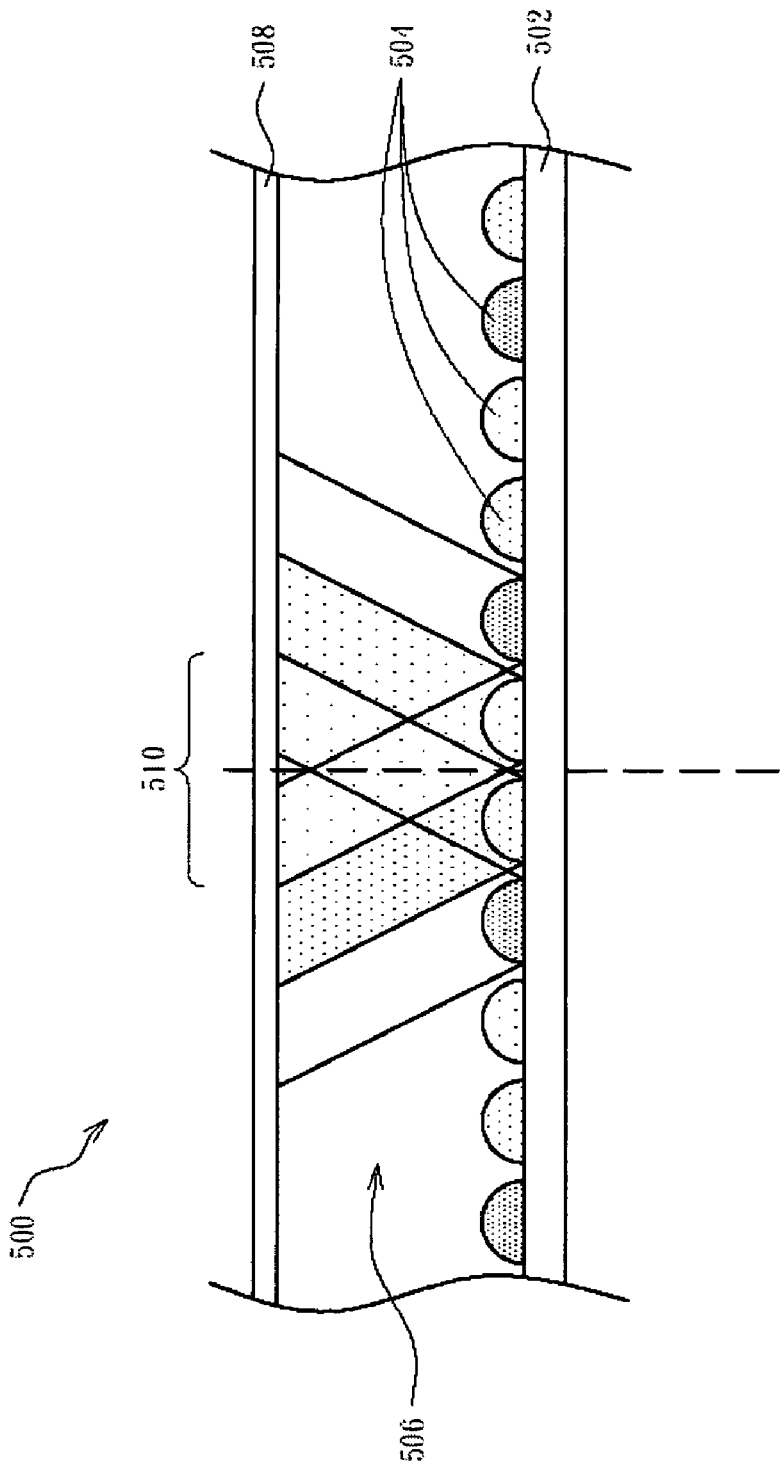
FIG. 5 illustrates a portion of a conventional backlight module.

The substrate 102 may be composed of a flexible material, so that the light guide plate 100 can be made flexible. This flexibility allows the backlight module to also be flexible, such that the backlight module according to some embodiments can be used in a flexible LCD device. Also, since the substrate 102 is a film, the elongate light guide elements 104 are directly formed on the surface of the film substrate 102. As depicted, light is mixed within each of the elongate light guide elements 104, so that a conventional light-mixing technique with a large light-mixing space (e.g., 506 in FIG. 5) can be avoided. Light mixing in each elongate light guide element 104 refers to mixing light of different colors (such as red, green, and blue). As a result of not requiring a large light-mixing space in the backlight module, the entire thickness of the backlight module that includes the light guide plate 100 of the present embodiment can be greatly reduced; for example, the thickness of the backlight module may be reduced to less than or equal to 2 mm. Moreover, since the elongate light guide elements 104 are directly formed on the surface of the substrate 102, the gap 112 between the adjacent elongate light guide elements 104 and the sizes of the elongate light guide elements 104 can be effectively controlled. In this manner, the gap 112 between the adjacent elongate light guide elements 104 can be reduced. For example, as noted above, in one example embodiment, the gap 112 between the adjacent elongate light guide elements 104 can be only about 50 μm. Furthermore, the uniformity of the light emitted by the backlight module can be increased based on the design of the light emission surface structures on the elongate light guide elements, such as the dot patterns or cut portions, on the elongate light guide elements.

Figure 2:
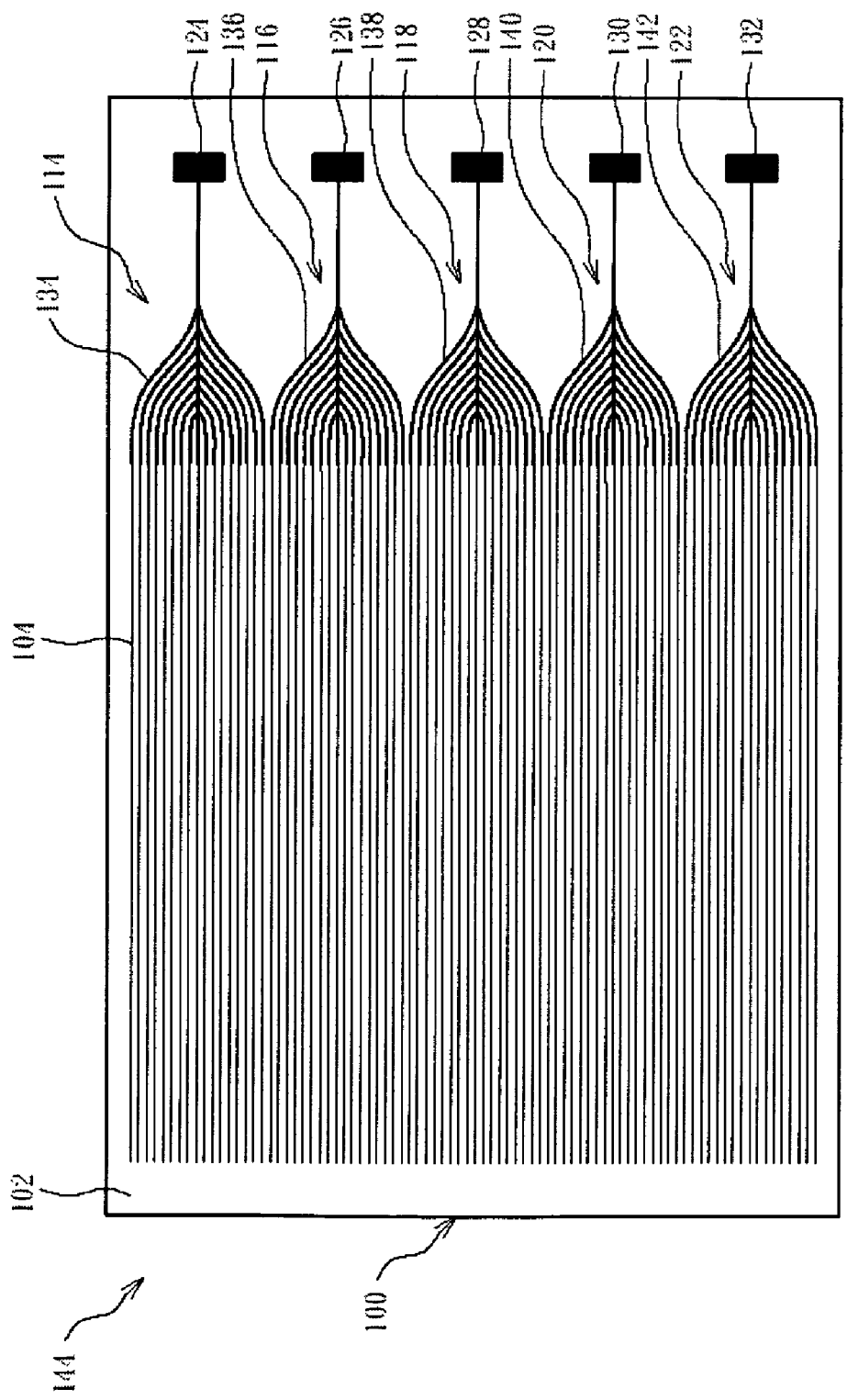
FIG. 2 is a top view of a backlight module in accordance with an embodiment of the present invention.

FIG. 2 is a top view of the backlight module 144 in accordance with an embodiment of the present invention, which backlight module 144 can be used in the LCD device of FIG. 1, for example. The backlight module 144 includes the light guide plate 100 of FIG. 1 and a plurality of light sources 124, 126, 128, 130 and 132. The light sources 124, 126, 128, 130 and 132 may be light-emitting diodes or laser diodes. The light sources 124, 126, 128, 130 and 132 have separate power sources, and the switches of the power sources may be separately controlled to independently turn on/off (activate/deactivate) the light sources. Effectively, the light sources 124, 126, 128, 130 and 132 are capable of operating independently.

In accordance with an embodiment, the light guide plate 100 is divided into plural regions, where five regions are depicted in FIG. 2 according to an example embodiment. The regions include a first region 114, a second region 116, a third region 118, a fourth region 120 and a fifth region 122, and the regions respectively correspond to a plurality of display regions of the liquid crystal panel 150 (FIG. 1) disposed proximate the backlight module 144. Each of the first region 114, the second region 116, the third region 118, the fourth region 120 and the fifth region 122 of the light guide plate 100 is provided with a respective set of elongate light guide elements 104, discussed above with respect to FIG. 1. The light sources 124, 126, 128, 130, and 132 provide light, respectively, to the first region 114, second region 116, third region 118, fourth region 120, and fifth region 122.

In addition to the elongate light guide elements 104 in the regions 114-122 of the light guide plate 100, additional intermediate elongate light guide elements 134, 136, 138, 140 and 142 are provided to optically connect the light sources 124-132 to corresponding light guide elements 104 in the respective regions 114-122. Note that the intermediate elongate light guide elements 134-142 are flexible such that they can be bent (as depicted in FIG. 2) to provide the desired optical connection between the light sources and the elongate light guide elements 104. The intermediate elongate light guide element 134 is between the first region 114 and the corresponding light source 124, the intermediate elongate light guide elements 136 are between the second region 116 and the corresponding light source 126, the intermediate elongate light guide elements 138 are between the third region 118 and the corresponding light source 128, the intermediate elongate light guide elements 140 are between the fourth region 120 and the corresponding light source 130, and the intermediate elongate light guide elements 142 are between the fifth region 122 and the corresponding light source 132, to respectively transmit the light emitted from the light sources 124-132 to the elongate light guide elements 104 in the corresponding regions 114-122. In one embodiment, the material of the intermediate elongate light guide elements 134, 136, 138, 140 and 142 may be the same as that of the elongate light guide elements 104. For example, the material can be an optical fiber material, such that the elongate light guide elements 104 and 134-142 are optical fibers. The intermediate elongate light guide elements 134, 136, 138, 140, 142 and the elongate light guide elements 104 may be concurrently directly formed by a mold pressing technique. The difference between the intermediate elongate light guide elements 134, 136, 138, 140, 142 and the elongate light guide elements 104 is that the intermediate elongate light guide elements 134, 136, 138, 140, 142 are not provided with light emission surface structures, such as dot patterns or cut portions, for emitting light to a visual region of an LCD device or other type of device. Moreover, the intermediate elongate light guide elements 134, 136, 138, 140 and 142 without light emission surface structures are also suitable for mixing the different color light emitted by the light sources. For example, the light sources include red light sources, green light sources and blue light sources, and the light is mixed within the elongate light guide elements 134, 136, 138, 140 and 142, so that the uniform light is transmitted into the elongate light guide elements 104. In the FIG. 2 embodiment, a plurality of intermediate elongate light guide elements are provided between each region of the light guide plate 100 and the corresponding light source. However, it is noted that there may be just a single elongate light guide element provided between each region of the light guide plate 100 and the corresponding light source. The number of elongate light guide elements can be varied according to the requirement of the device.

When the light sources 124, 126, 128, 130 and 132 are turned on, the light emitted by the light sources 124, 126, 128, 130 and 132 are respectively transmitted by the corresponding intermediate elongate light guide elements 134, 136, 138, 140 and 142 into the elongate light guide elements 104 in the regions 114-122. When light traveling through an elongate light guide element 104 reaches a light emission surface structure, such as a cut portion 106 of the elongate light guide element 104, the light is emitted out of the elongate light guide element 104 resulting from the change of the total reflection surface, so as to provide the liquid crystal panel 150 with the required light, such as shown in FIG. 1.

Figure 3A:
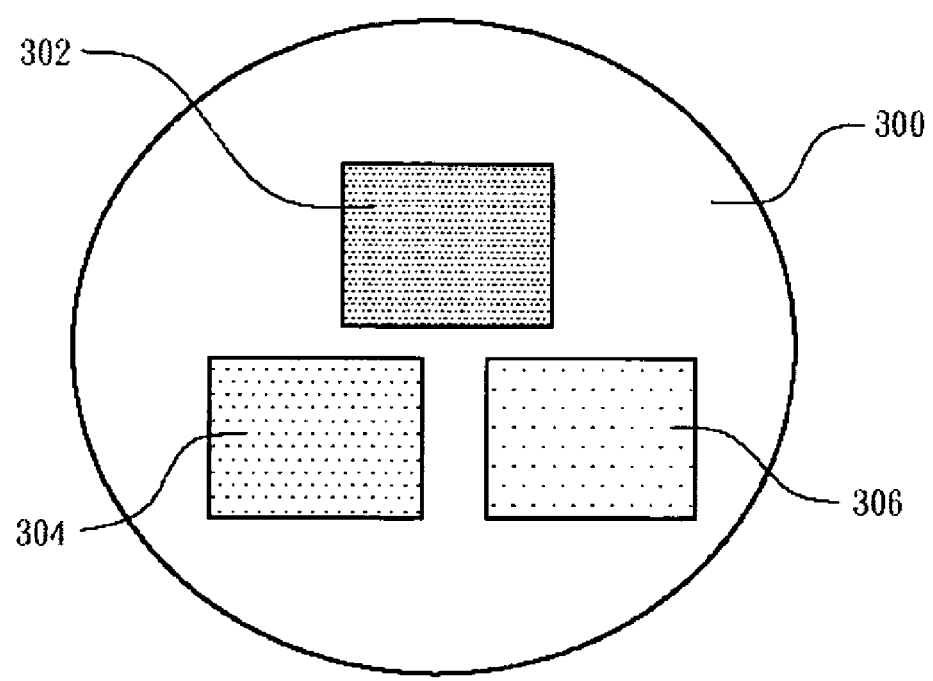
FIGS. 3A-3D illustrate different configurations of light sources, according to some embodiments.
Figure 3B:
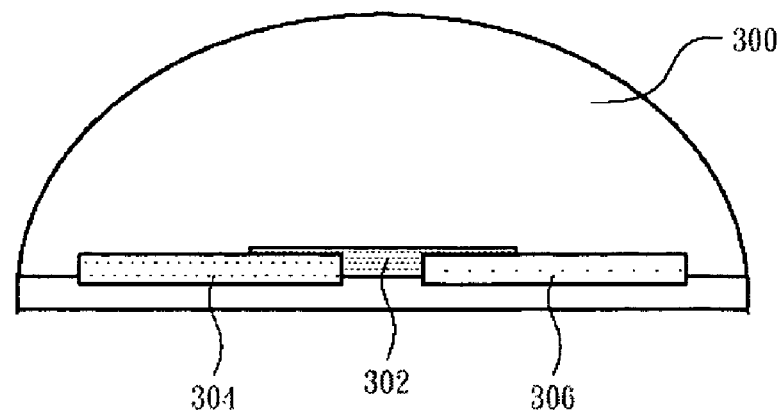
Figure 3C:
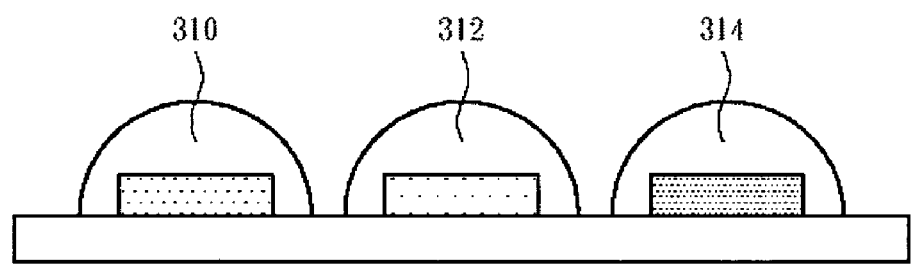

There can be several different configurations of the light sources 124-132. In a first example configuration, as depicted in FIGS. 3A-3B, each light source is a single package 300 that includes three color (e.g., red, green, blue) LED chips 302, 304, and 306 that together emit mixed light (e.g., white light). FIG. 3A is a top view, whereas FIG. 3B is a side view, of the single package 300, which is considered an LED. Alternatively, in a second example configuration, each light source includes three color (e.g., red, green, blue) LEDs 310, 312, 314.

Figure 3D:
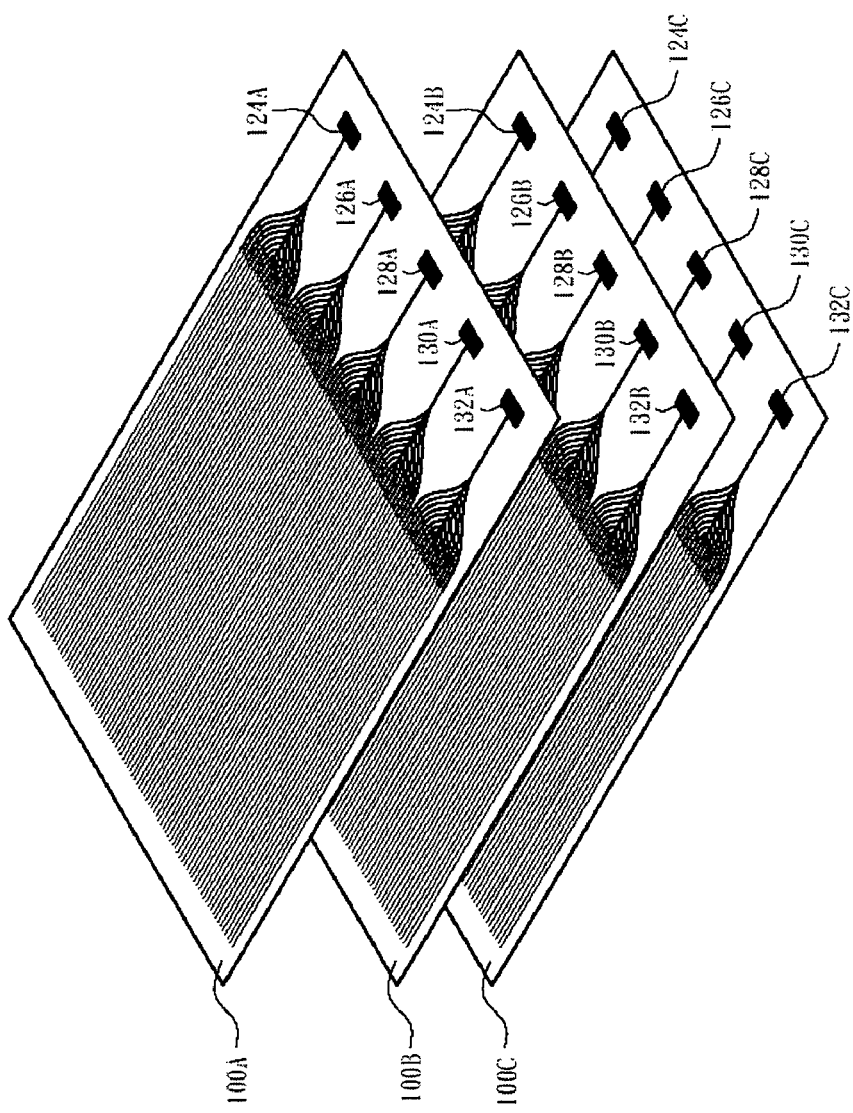

In yet another configuration, the light sources 124-132 that are provided on the common substrate 102 all have the same color (e.g., red, green, or blue). In other words, the light provided by the light sources into the elongate light guide elements 104 has one color. In such a configuration, the light guide plate 100 of FIG. 2 has to be repeated three times for three different colors, as depicted in FIG. 3D. In FIG. 3D, light guide plate 100A is identical to light guide plate 100 of FIG. 2 except that light guide plate 100A include light sources 124A-132A of a first color. Similarly, light guide plates 100B and 100C are identical to light guide plate 100 of FIG. 2 except that light guide plate 100B include light sources 124B-132B of a second color, and light guide plate 100C include light sources 124C-132C of a third color.

In the arrangement of FIG. 3D, the light guide plates 100A-100C, that emit light having different colors, can be stacked in a vertical stack such that light guide plate 100A is on light guide plate 100B, and light guide plate 100B is on light guide plate 100C. In some embodiments, a gap (such as an air layer) is provided between adjacent light guide plates 100A-100C. The gap provides an optical interface at surfaces of the elongate light guide elements such that total light reflection can occur within the elongate light guide elements, except in regions containing light emission surface structures. The gap between light guide plates can be small, such as in the range between 1 mm and 0.1 mm.

Note that in the embodiment of FIG. 3D, a color-mixing space is employed between the backlight module an a liquid crystal panel to mix the different color light from the three light guide plates 100A-100C. However, the color-mixing space can be small as compared to color-mixing spaces used with conventional backlight modules, since the light emitted from the light emission surface structures of the light guide plates have even brightness distribution. Therefore, a backlight module of reduced thickness can be provided.

As noted above, the light sources 124-132 of FIG. 2 have separate power sources, and the switches of the light sources 124-132 can be independently controlled, so that the optical distribution can be different in each region by respectively controlling the switches of the light sources 124, 126, 128, 130 and 132. In an alternative embodiment, instead of dividing the light guide plate 100 into five generally rectangular regions arranged in linear sequence as depicted in FIG. 2, the light guide plate 100 may be divided into an array of regions.

Figure 4:
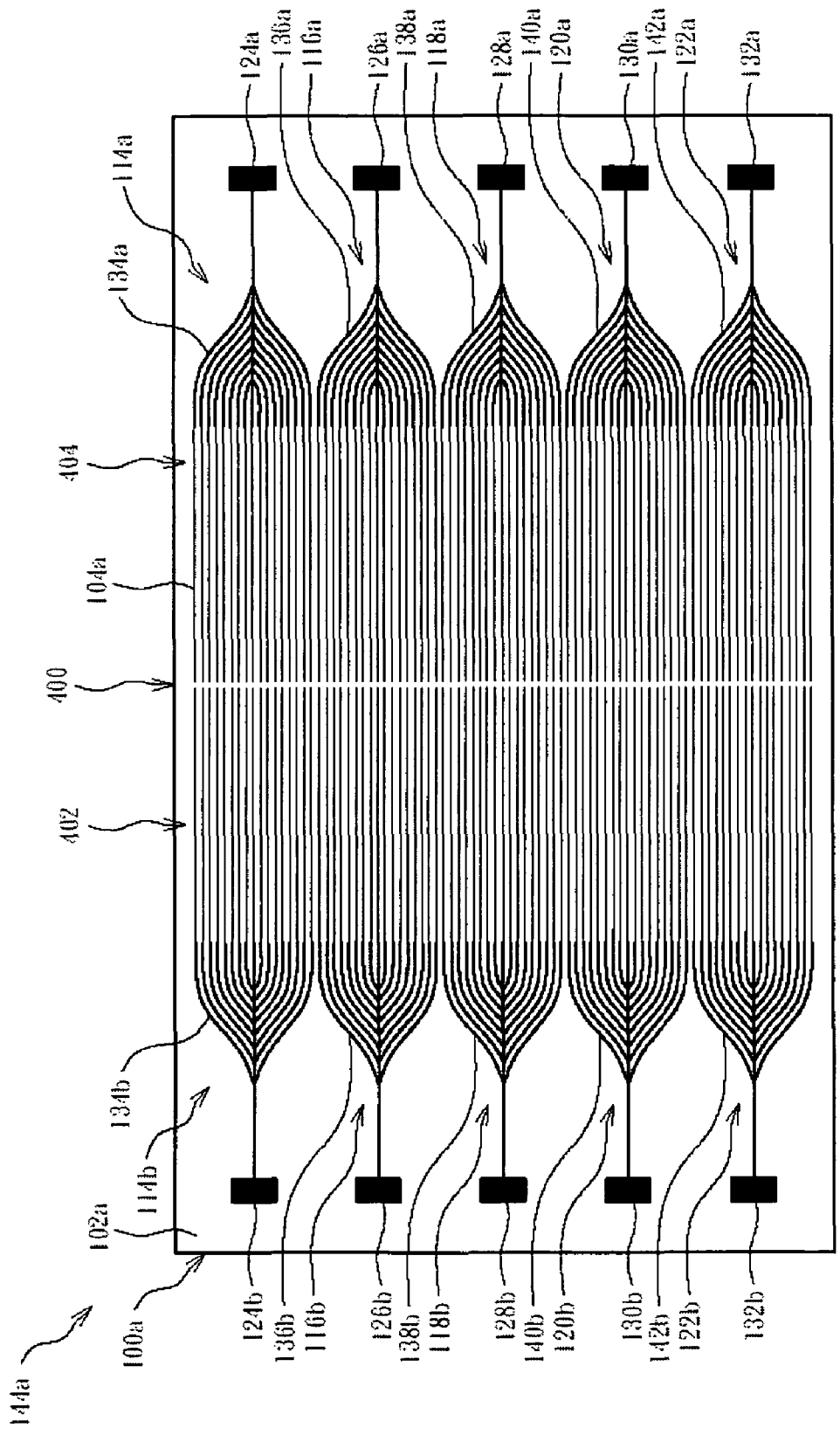
FIG. 4 is a top view of a backlight module in accordance with another embodiment of the present invention.

For example, in another embodiment, such as in a backlight module 144a shown in FIG. 4, a light guide plate 100a may be arranged as an array of regions in five rows and two columns 402, 404. The two columns 402, 404 are divided by a separation gap 400. The first row includes region 114a in column 404, and region 114b in column 402; the second row includes regions 116a, 116b; the third row includes regions 118a, 118b; the fourth row includes regions 120a, 120b, and the fifth row includes regions 122a, 122b. A surface of a substrate 102a in each region of the light guide plate 100a is provided with a plurality of elongate light guide elements 104a. The first region 114a, the second region 116a, the third region 118a, the fourth region 120a, the fifth region 122a, the sixth region 114b, the seventh region 116b, the eighth region 118b, the ninth region 120b and the tenth region 122b respectively correspond to the light sources 124a, 126a, 128a, 130a, 132a, 124b, 126b, 128b, 130b, and 132b to respectively provide the ten regions with light. Intermediate elongate light guide elements 134a, 136a, 138a, 140a, 142a, 134b, 136b, 138b, 140b, and 142b are further respectively provided between the first region 114a, the second region 116a, the third region 118a, the fourth region 120a, the fifth region 122a, the sixth region 114b, the seventh region 116b, the eighth region 118b, the ninth region 120b, the tenth region 122b and the corresponding light sources 124a, 126a, 128a, 130a, 132a, 124b, 126b, 128b, 130b, 132b, to optically connect light emitted from the light sources 124a, 126a, 128a, 130a, 132a, 124b, 126b, 128b, 130b and 132b into the elongate light guide elements 104a in the regions 114a-122a and 114b-122b. The light sources may be light-emitting diodes or laser diodes, where the light sources can have separate power sources, and the switches of the power sources may be separately controlled, so the light sources are capable of operating independently. As a result, a different optical distribution may be provided to each region according to the needs of frames with the different optical distributions by respectively controlling the switches of the light sources 124a, 126a, 128a, 130a, 132a, 124b, 126b, 128b, 130b and 132b.

Accordingly, the backlight modules 144 and 144a according to some embodiments are suitable for a scanning backlight unit or a dynamic backlight unit for improving the dynamic image and the contrast, thus further enhancing the quality of image.

It should be noted that although each region of the light guide plate is provided with a plurality of elongate light guide elements in the aforementioned embodiments, in an alternative embodiment, each region of the light guide plate can be provided with only one larger elongate light guide element extending across the light guide plate, and the amount and the size of the elongate light guide elements in every region of the light guide plate may be different and can be modified according to the requirements of the devices.

The elongate light guide elements of the light guide plate are directly formed on the surface of the substrate, so that the distance between the adjacent regions can be effectively controlled and reduced, and the light uniformity of the backlight module can be increased. Moreover, the problems resulting from the fabrication and the combination of the light guide plates in different regions, such as the positioning and the alignment of the light guide plates, can be avoided. Furthermore, the light emitted from the backlight module is through the elongate light guide elements of the light guide plate, so that the amount of light sources, such as light-emitting diodes or the laser diodes, can be greatly decreased. In addition, the mixing of the light is performed by the elongate light guide elements to replace the conventional method for mixing light with a relatively large light-mixing space; as a result, the distance between the elongate light guide elements and the display panel can be reduced, so that the overlap phenomenon of the mixing light between the regions can be effectively avoided or reduced to further enhance the image contrast between different regions.

The backlight modules 144 and 144a of the aforementioned embodiments can be applied to a LCD device. For example, the liquid crystal panel 150 of FIG. 1 can be disposed above the light guide plate 100 of the backlight module 144 to complete the structure of the LCD device. The liquid crystal panel 150 typically includes a color filter substrate, a liquid crystal layer and a thin film transistor substrate. The backlight modules 144 and 144a can provide different optical distributions in different regions, so that the brightness of the backlight unit of the liquid crystal display is increased or decreased according to the light or shade of the frame in different regions, and the display frame with finer differences between gray scales and the higher image contrast can be achieved.

According to the aforementioned description, one advantage of some embodiments the present invention is that the backlight module is divided into at least two regions, wherein each region corresponds to at least one elongate light guide element of a light guide plate, and the elongate light guide elements in different regions respectively correspond to separate power sources, so that the optical distribution can be different region by region by respectively controlling the light sources. Thus, the backlight module of the present invention can be suitable for a scanning liquid crystal display or a dynamic liquid crystal display.

According to the aforementioned description, another advantage of some embodiments of the present invention is that the elongate light guide elements are directly formed on a substrate of a light guide plate, so that the gaps between the adjacent elongate light guide elements in each region and the gaps between the elongate light guide elements respectively in the adjacent regions can be effectively controlled, thereby enhancing the display quality and increasing the production yield.

According to the aforementioned description, a further advantage of some embodiments of the present invention is that in the LCD device, a plurality of elongate light guide elements of a backlight module are formed on a film substrate by an optical fiber fabricating technique, so that a light guide plate with micro-gap (reduced gaps 112 in FIG. 1) can be obtained. The display light is transmitted through the elongate light guide elements of the light guide plate, so that the amount of light-emitting diodes or laser diodes can be decreased, thereby reducing the required distance for light-mixing, effectively reducing the thickness of the liquid crystal display and effectively solving the problems of the conventional backlight module having light-mixing overlap resulting in poor uniformity of brightness.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A backlight module, comprising:
   a light guide plate divided into at least two regions and comprising:
   a substrate; and
   a plurality of first elongate light guide elements disposed on a surface of the substrate and located in the regions such that each of the regions includes a respective set of multiple first elongate light guide elements; and
   at least two light sources respectively corresponding to the regions to provide the first elongate light guide elements in the regions with light, wherein each of the sets of multiple first elongate light guide elements is connected to a corresponding single one of the light sources, and wherein the regions are separate from one another such that the first elongate light guide elements of one of the regions are not interleaved with the first elongate light guide elements of any other one of the regions.

2. The backlight module according to claim 1, wherein the light sources are configured to operate independently.

3. The backlight module according to claim 1, wherein a material of the substrate is selected from the group consisting of PET, PMMA, and glass.

4. The backlight module according to claim 1, wherein the substrate is one of a diffusive reflection sheet and a silver reflection sheet.

5. The backlight module according to claim 1, wherein each pair of adjacent ones of the first elongate light guide elements has a gap between the adjacent first elongate light guide elements, and the gap is less than 100 µm.

6. The backlight module according to claim 5, wherein the gap is less than 50 µm.

7. The backlight module according to claim 1, wherein each first elongate light guide element comprises at least one dot pattern or at least one cut portion to enable emission of light from inside the corresponding first elongate light guide element.

8. The backlight module according to claim 1, wherein the light sources are selected from the group consisting of light-emitting diodes and laser diodes.

9. The backlight module according to claim 1, further comprising second elongate light guide elements located between the regions and corresponding light sources to transmit light from the corresponding light sources to the corresponding first elongate light guide elements, wherein each of the second elongate light guide elements connects a corresponding one of the light sources to a corresponding one of the sets of multiple first light guide elements.

10. The backlight module according to claim 1, wherein the first elongate light guide elements are light guide pipes.

11. The backlight module according to claim 1, wherein the first elongate light guide elements comprise optical fibers.

12. The backlight module according to claim 1, wherein mixing of different color light is performed in each of the elongate light guide elements.

13. The backlight module according to claim 1, wherein each first elongate light guide element has emission surface structures to allow emission of light resulting from light propagating inside the first elongate light guide element, the emission of light to provide light to another structure.

14. The backlight module according to claim 1, wherein a first of the light sources for a respective first of the regions is configured to produce first color light, and a second of the light sources for a respective second one of the regions is configured to produce second color light different from the first color light.

15. The backlight module of claim 1, wherein the regions are divided into an array of regions.

16. A liquid crystal display device including plural display regions, wherein the liquid crystal display device comprises:
a liquid crystal panel; and
a backlight module to provide light to the liquid crystal panel and comprising:
a light guide plate divided into plural regions respectively corresponding to the display regions, wherein the light guide plate comprises:
a substrate; and
a plurality of first elongate light guide elements disposed on a surface of the substrate and located in the light guide plate regions, wherein each of the light guide plate regions has multiple first elongate light guide elements, and wherein the light guide plate regions are separate from one another such that the first elongate light guide elements of one of the light guide plate regions are not interleaved with the first elongate light guide elements of any other one of the light guide plate regions; and
plural light sources respectively corresponding to the light guide plate regions to provide the first elongate light guide elements in the light guide plate regions with light, wherein the first elongate light guide elements of each of the light guide plate regions are connected to a corresponding single one of the light sources,
wherein the first elongate light guide elements have light emission surface structures to enable emission of light from within the first elongate light guide elements toward the liquid crystal panel.

17. The liquid crystal display device according to claim 16, wherein the plural lights sources are configured to operate independently.

18. The liquid crystal display device according to claim 16, wherein each pair of adjacent ones of the first elongate light guide elements has a gap between the adjacent first elongate light guide elements, and the gap is less than 100 μm.

19. The liquid crystal display device according to claim 16, wherein each pair of the adjacent ones of the first elongate light guide elements has a gap between the adjacent first elongate light guide elements, and the gap is less than 50 μm.

20. The liquid crystal display device according to claim 16, wherein the light sources are selected from the group consisting of light-emitting diodes and laser diodes.

21. The liquid crystal display device according to claim 16, further comprising second light guide elements located between the light guide plate regions and corresponding light sources to transmit light from the corresponding light sources to the corresponding first elongate light guide elements.

22. The liquid crystal display device according to claim 21, wherein the first and second elongate light guide elements comprise optical fibers.

23. The liquid crystal display device according to claim 16, wherein each of the light sources for a respective one of the light guide plate regions is configured to produce color light that is different from color light produced by another one of the light sources for another respective one of the light guide plate regions.

24. The liquid crystal display device according to claim 16, wherein the light guide plate regions are divided into an array of regions.

25. A method of providing a backlight module, comprising:
providing a light guide plate divided into a plurality of regions and having a substrate and optical fibers formed on the substrate, wherein each of the plurality of regions has a corresponding set of multiple optical fibers, and wherein the regions are separate from one another such that the optical fibers of one of the regions are not interleaved with the optical fibers in any other one of the regions;
providing light sources to provide light into the optical fibers, wherein each of the sets of multiple optical fibers is connected to a corresponding single one of the light sources; and
emitting light from light emission structures of the optical fibers, wherein the emitted light is directed to another structure.

26. The method of claim 25, further comprising directing light emitted from the optical fibers toward a liquid crystal panel.

27. The method of claim 26, further comprising mixing different color light in the optical fibers to avoid provision of a large light-mixing space.

28. The method of claim 25, wherein the light guide plate and light sources are part of a first assembly, and wherein the light sources of first assembly produce light of a first color, the method further comprising:
providing a second assembly having a second light guide plate having second optical fibers formed on the second substrate;
providing second light sources to provide light of a second, different color into the second optical fibers; and
emitting light from light emission structures of the second optical fibers, wherein the emitted light from the second optical fibers is directed to the another structure.

29. The method of claim 28, further comprising stacking the first and second assemblies in the backlight module.

30. The method of claim 25, wherein a first of the light sources for a respective first of the regions is configured to produce first color light, and a second of the light sources for a respective second one of the regions is configured to produce second color light different from the first color light.

31. The method of claim 25, wherein the regions are divided into an array of regions.

* * * * *